United States Patent [19]

Langer

[11] 3,914,404
[45] Oct. 21, 1975

[54] DENTIFRICES AND METHOD FOR REDUCING ENAMEL SOLUBILITY

[75] Inventor: Horst G. Langer, Wayland, Mass.

[73] Assignee: The Dow Chemical Company, Midland, Mich.

[22] Filed: Apr. 16, 1970

[21] Appl. No.: 29,281

Related U.S. Application Data

[63] Continuation-in-part of Ser. No. 790,469, Jan. 10, 1969, abandoned, which is a continuation-in-part of Ser. No. 714,411, March 20, 1968, abandoned, which is a continuation-in-part of Ser. No. 359,778, April 14, 1964, abandoned, which is a continuation of Ser. Nos. 43, Jan. 4, 1960, abandoned, and Ser. No. 165,962, Jan. 12, 1962, abandoned.

[52] U.S. Cl. .................................. 424/48; 424/54
[51] Int. Cl.$^2$ ........................ A61K 9/68; A61K 7/22
[58] Field of Search ............................. 424/48–58; 167/93

[56] References Cited
UNITED STATES PATENTS

| | | | |
|---|---|---|---|
| 3,105,798 | 10/1963 | Holliday et al. | 424/52 |
| 3,282,792 | 11/1966 | Fiscella | 424/52 |
| 3,544,678 | 12/1970 | Griebstein | 424/52 |

FOREIGN PATENTS OR APPLICATIONS

| | | | |
|---|---|---|---|
| 922,385 | 3/1963 | United Kingdom | 424/54 |

OTHER PUBLICATIONS

Dental Abstracts, Vol. 8, p. 372, June 1963.
Drug and Cosmetic Industry, Vol. 67, No. 6, p. 833, Dec. 1950.
Langer, Journal of Dental Research, Vol. 39, p. 740, July–Aug. 1960.

*Primary Examiner*—Richard L. Huff
*Attorney, Agent, or Firm*—Theodore Post; C. Kenneth Bjork

[57] ABSTRACT

Dentifrice compositions fortified with a trace to 15 percent of a substantially water-insoluble stannous chelate of a synthetic amino carboxylic acid wherein the chelate moieties have an Sn:N ratio of 1:1. Their use induces reaction of stannous tin with dental enamel to form a complex basic stannous phosphate, and thereby reduces the solubility of the enamel.

4 Claims, No Drawings

DENTIFRICES AND METHOD FOR REDUCING ENAMEL SOLUBILITY

The application is a continuation-in-part of Ser. No. 790,469, filed Jan. 10, 1969, which is a continuation-in-part of Ser. No. 714,411, filed Mar. 20, 1968, which is a continuation-in-part of Ser. No. 359,778, filed Apr. 14, 1964, which in turn is a continuation of Ser. No. 43, filed Jan. 4, 1960 and Ser. No. 165,962, filed Jan. 12, 1962, all now abandoned.

BACKGROUND OF THE INVENTION

Certain principles concerning caries reduction have been delineated by earlier workers. All involve inorganic reactions with the non-living portion of the erupted or mineralized mammalian teeth, that portion identified as the enamel, which consists almost entirely of the mineral calcium hydroxyapatite. The principles upon which modern caries reduction are based are the formation with the non-living inorganic mineral matter of the enamel of a more insoluble complex phosphate than the normally present calcium hydroxyapatite using (a) a source of reactive cations such as stannous tin or (b) a source of reactive anions, such as fluoride or monofluorophosphate (MFP$^{(R)}$) or (c) a source both of reactive cations and of reactive anions. Thus, stannous fluoride has been used because it reacts with the non-living tooth enamel to form an extremely insoluble basic stannous phosphate. Sodium fluoride has been used because it reacts with the non-living tooth enamel to form an insoluble calcium fluorophosphate. Sodium monofluorophosphate (MFP$^{(R)}$) has been used because it, too, reacts with the non-living tooth enamel to form an insoluble calcium fluorophosphate.

The use by dentists of water-soluble fluorides for topical application to teeth for purposes of caries control has become a relatively common practice. The fluoride usually is in the form of a solution of a relatively water-soluble fluoride compound. More recently, it has been learned that certain metal ions also have their effect on the prevention of caries. Bivalent ionic tin has received a substantial degree of acceptance for such application as a fluoride. Quite commonly, dentists employ aqueous acidic solutions of stannous fluoride for application to the teeth. A disadvantage of stannous fluoride is that it is not stable in solution and, for best results, it is necessary for the dentist to prepare fresh solutions daily.

Stannous fluoride has been employed in dentifrices so that benefit from topical application of the compound could be obtained by continued application to the tooth enamel on a daily basis. Where the dentifrice is an aqueous paste, the problem of the stability of the tin compound again arises.

SUMMARY OF THE INVENTION

The present invention concerns compositions and methods using a new source of stannous tin for incorporation in dentifrices by which term is meant mouth washes, tooth pastes, tooth powders and chewing gums, i.e., compositions for introduction into the oral cavity as cleansing compositions.

The novel dentifrices contain tin in the stannous form as a substantially water-insoluble, non-ionizing chelate of a synthetic amino carboxylic acid having an Sn:N ratio of the chelate moieties of 1:1, in the amount of 0.00001 to 15 weight percent. The dentifrices of this invention thus make possible a method for supplying and contacting tooth enamel several times daily with a minor to trace source of reactive tin which reacts with exposed tooth enamel to form a highly insoluble basic stannous phosphate.

It is, accordingly, an object of this invention to provide a dentifrice for applying to, and reacting with, tooth enamel a new form of stannous tin derived from a stable, substantially water-insoluble stannous chelate for purposes of enamel solubility reduction.

It is a further object of this invention particularly to provide a chewing gun containing a stable, substantially water-insoluble stannous chelate to afford a new form of stannous tin reactive with tooth enamel to reduce enamel solubility.

Other objects and advantages of the invention will in part be obvious and in part appear hereinafter.

An effective amount of topical application of stannous tin for the purpose of enamel solubility reduction can be had by employing as a component of the novel dentifrices herein taught at least 0.00001 weight percent of a stannous chelate of a chelating agent corresponding to the following general formula:

$$(HOOCCH_2)_2NR \qquad (I)$$

wherein R is selected from the group consisting of H and  $CH_2COOH$ (II)
wherein $n$ represents an integer which is 2, 3, or 4 and $m$ represents an integer which is 0, 1, 2, 3, or 4, and of the alkali metal salts of such chelating agents, wherein one or two of the —$CH_2COOH$ groups may be replaced by a —$CH_2CH_2OH$ group, resulting in a stannous tin chelate represented by the formula

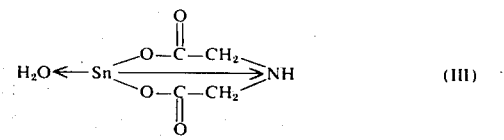

(III)

when R is H and $m$ is zero; by the formula

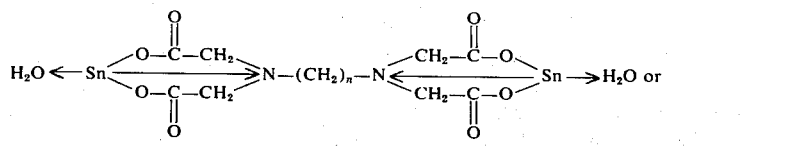

(IV A)

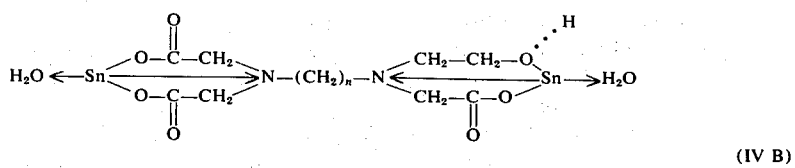

(IV B)

when m is 1; and by the formula

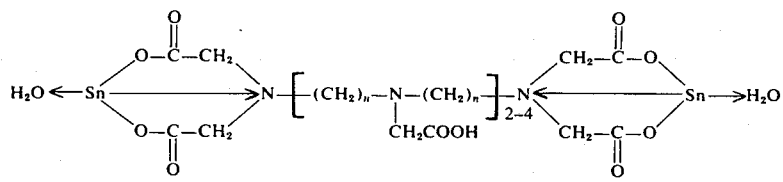

(V)

wherein 1 or 2 of the —CH$_2$COOH groups may be replaced by a —CH$_2$CH$_2$OH group when m of moiety (II) above is 1, 2, 3, or 4. All of such stannous chelates are substantially water insoluble, i.e., have a water solubility generally less than one percent by weight at room temperature, all the chelate moieties have an Sn to N ratio of 1 to 1, and all provide a source of tin reactive with tooth enamel when introduced into the oral cavity as chewing gum or other dentifrice, to reduce the enamel solubility.

Representative of the foregoing stannous chelates are distannous chelate of ethylenediaminetetraacetic acid (Sn$_2$EDTA); distannous chelate of hydroxyethyl ethylenediaminetriacetic acid; monostannous chelate of nitrilotriacetic acid, monostannous chelate of iminodiacetic acid and of N-substituted iminodiacetic acids such as monostannous chelate of N-methyl-, N-ethyl-, N-propyliminodiacetic acid, etc., distannous chelate of propylenediaminetetraacetic acid; distannous chelate of trimethylenediaminetetraacetic acid; distannous chelate of tetramethylenediaminetetraacetic acid; and generally the stannous chelates described in U.S. Pat. No. 3,152,155.

Unlike the stannous salts of the prior art, e.g., stannous fluoride and chloride, which are water soluble and unstable in aqueous media, or other chelates which are water soluble, unstable and too tightly chelated to be effective, the stannous chelates used in the dentifrices of this invention are substantially insoluble in water and stable in aqueous media and provide an effective source of stannous tin. The distannous chelate of ethylenediaminetetraacetic acid, for example, has a water solubility of less than 0.05 weight percent at room temperature and is stable in aqueous formulations. The low solubility in water contributes to the oxidation resistance of such chelates. In solution in saliva, the minor to trace amount of dissolved stannous chelate gives an acid reaction which, in the presence of naturally occurring chelating agents normally present in the mouth, such as sugars, proteins, amino acids and lactic acid, is believed to promote a reaction according to the following simplified equations:

$$SnR + R'H_2 \longrightarrow SnR' + RH_2$$
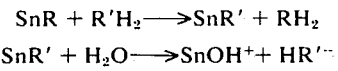

In the equations, SnR represents a water-insoluble chelate as utilized in the dentifrices herein, R'H$_2$ represents a naturally occurring chelating agent normally present in the mouth, which compound has reactive hydrogen groups and the SnOH$^+$ cation represents a species which has been demonstrated polarographically to form by hydrolysis of tin (II) salts and complexes in aqueous solution; Acta Chemica Scandinavica, 12 (1958), 198–223. The SnOH$^+$ cation can react with the calcium hydroxyapatite of the enamel to form the insoluble basic stannous phosphate, in the same manner as stannous fluoride is believed now ultimately to react to form the same basic stannous phosphate. Because of the complexities of the above reactions involving minute quantities of reactants, it has not yet been possible conclusively to demonstrate by present analytic techniques that such reactions do, in fact, take place. Consequently, it is not desired to be bound by this theory, even though (1) the theory is consistent with all experimentally determined results, i.e., the formation with enamel of the basic stannous phosphate when a dentifrice containing one of the claimed stannous chelates is used and (2) such experimentally determined results are entirely consistent with said theory. In any event, there is an exchange of the calcium of the enamel for stannous tin provided by the chelate. As this exchange proceeds, a further minor to trace amount of stannous chelate dissolves and the exchange of stannous tin for calcium continues at the exposed surface of the tooth enamel while the dentifrice is in the mouth. Since the exposed tooth enamel surface in the mammalian mouth is relatively small, and the dentifrices are used on a continuing basis several times a day, an amount of stannous chelate as low as 0.00001 weight percent is effective in reducing enamel solubility. The exposure of enamel surfaces to the stannous chelates of the dentifrices herein described thus provides the tooth enamel with a surface of an insoluble basic stannous phosphate; J. of Dent. Res., 39, 740, July–August 1960; J. Am. Dent. Assn., 77, 1308, Dec. 1968. The compositions and methods disclosed are useful inter alia in the reduction of enamel solubility of valuable domesticated animals, such as, for example, dogs.

DETAILED DESCRIPTION OF THE INVENTION

The following examples describe representative specific embodiments and the best modes contemplated by the inventor of carrying out the invention, but are not to be construed as limiting the same. In the examples, percentages given are by weight and temperatures are given in centigrade degrees.

EXAMPLE 1

Sn$_2$EDTA was added to the diet of separate groups of Hunt-Hoppert caries-susceptible rats at a level of 200 p.p.m. (Group A, 20 animals) and 300 p.p.m. (Group B, 13 animals). At the same time, a control group was established, whose diet consisted of the same feed but without Sn$_2$EDTA (Group C, 20 animals). The animals were examined periodically for evidence of caries lesions. At examination following sacrifice, the teeth of the Group C animals had an average of 12.2 caries lesions per animal and a tin level in their tooth enamel of 4 p.p.m. The teeth of the Group B animals had an average of 7.5 caries lesions per animal and a tin level in their tooth enamel of 225 p.p.m. The teeth of the Group A animals had an average of 9.1 caries lesions per animal and a tin level in their tooth enamel of 160 p.p.m. Statistical evaluation was by analysis of variance. Tin was determined by emission spectroscopy.

Example 2 - Tooth Paste

| | |
|---|---|
| Citrus Pectin | 3.0% |
| Glycerin (28°Bé.) | 71.5% |
| Water, distilled | 25.0% |
| Citric Acid | 0.5% |

These are mixed to form a jelly which is then mixed with a mild abrasive, such as precipitated chalk, in about equal weight. Preferably 3% of tin chelate, e.g. distannous ethylenediaminetetraacetate, is incorporated in this paste, but it can be varied from about 1% to about 15%.

Example 3 - Tooth Paste

| | |
|---|---|
| Tragacanth | 1.0% |
| Citrus Pectin | 5.0% |
| Glycerin (28°Bé.) | 30.0% |
| Water, Distilled | 63.0% |
| Citric Acid | 1.0% |

These are mixed to form a solution which is then filled out with an abrasive, such as precipitated chalk and fine kaolin (about 50% of the total paste) to form a paste. Flavor to taste is added. To the paste is preferably added about 4% of the tin chelate, distannous ethylenediaminetetraacetate. Advantageously, 1 to 15% of the chelate is suitable.

Example 4 - Tooth Powder

| | |
|---|---|
| Precipitated Chalk (very fine) | 200 Parts |
| Orris Root (powdered) | 20 parts |
| Common Salt (pulverized) | 10 parts |
| Sodium Bicarbonate | 20 parts |
| Menthol Crystals (pulverized) | 2 parts |
| Distannous Chelate of Ethylenediaminetetraacetic acid | 7.5 parts |

The ingredients are mixed and flavored with 10–20 drops of oil of wintergreen or oil of peppermint.

Example 5 - Mouth Wash

| | |
|---|---|
| Water, Distilled | 84 |
| Citrus Pectin | 5 |
| Citric Acid | 1 |
| Peppermint Oil | 10 |
| Distannous Chelate of Ethylenediaminetetraacetic Acid - to limit of solubility | |

Example 6 - Astringent Mouth Wash

| | |
|---|---|
| Sodium Bicarbonate | 12.5 |
| Borax | 12.5 |
| Zinc Chloride | 1.5 |
| Menthol | 0.25 |
| Alcohol | 25.0 |
| Glycerin | 50.0 |
| Cinnamon Water | 200.0 |
| Distannous Chelate of Ethylenediaminetetraacetic Acid - to limit of solubility | |

The method of developing an adequate level of tin treatment with topical application of tin to the teeth through a chewing gum medium is something which hitherto has not been practicable. The modification of chewing gum compositions, as other dentifrices, by incorporating therein about 0.00001 to 15% of one of the above stannous chelates is advantageous. Thus, virtually any chewing gum composition may be modified by the incorporation of one of the above-described tin chelates without appreciably changing the physical appearance and properties or flavor of the gum.

Some typical chewing gum formulations are the following:

Example 7

| | |
|---|---|
| Gum Base | 100 parts |
| Powdered sugar | 150 parts |
| Corn syrup | 80 parts |
| $Sn_2''EDTA$ | 10 parts |

The gum base, consisting of chicle, pontianak, gutta soh, gum katiaw, latexes, jelutong, balsams, and/or synthetic gums and polymers, and waxes or mixtures thereof, also including minor amounts of inert fillers such as talc, magnesium oxide, calcium carbonate, aluminum hydroxide, hydrous silica, and mixtures thereof, is heated to the softening point and intimately mixed with finely powdered sugar and corn syrup. Artificial sweeteners may also be used. Flavoring is added to desired taste. To this mixture, finely powdered $Sn_2''EDTA$ is added and blended with the other ingredients. After cooling, the gum is processed in the conventional manner, i.e., extruded and cut into desired form. It is to be understood that any conventional chewing gum base such as jelutong and paraffin wax; pontianak gum; gutta katiaw; gutta soh and candelilla wax; jelutong, gutta soh, and wax may be employed when forming a chewing gum mix of gum base, sweetener and flavoring, and incorporating one of the tin chelates in accordance with this invention.

Example 8

| | |
|---|---|
| Gum base | 20% |
| Pulverized sugar | 60% |
| Corn syrup | 17% |

These are mixed and about 1% of a desired flavoring added. There is incorporated about 2% of the distannous chelate of ethylenediaminetetraacetic acid in this mixture, but it can be varied from about 0.00001% to about 15%. After blending and cooling, the gum is processed.

Example 9

To a chewing gum formulation as described in Example 7, five parts of stannous chelate of iminodiacetic acid is added, blended with the other ingredients and processed in the usual way.

Example 10

After mixing the gum base, sweetener and flavoring in accordance with the procedure of Example 7, add twelve parts distannous chelate of propylene diaminetetraacetate and blend the ingredients in the same manner.

Example 11

A chewing gum mix is prepared employing about 20% of a gum base as shown in Example 7, about 59% of pulverized sugar, about 18% commercial corn syrup and about 1% of a desired flavor. To the mixture is added from 0.00001 to 15% of a stannous chelate and blended therein. The stannous chelates to be incorporated in the gum mix include distannous chelate of ethylenediaminetetraacetic acid; distannous chelate of hydroxyethylethylenediaminetriacetic acid; monostannous chelate of nitrilotriacetic acid; distannous chelate of propylenediaminetetraacetic acid; distannous chelate of trimethylenediaminetetraacetic acid; and distannous chelate of tetramethylenediaminetetraacetic acid.

It is to be understood that the percentages of basic material can be varied widely to achieve the desired physical properties of the gum, i.e., taste, flavor, etc. Correspondingly, the amount of tin chelate additive can be varied widely, depending, in part, on the final size of the piece of gum. Additionally, due to the extremely low toxicity of $Sn_2''EDTA$, its proportions can be varied through a range of concentrations such as 15% down to 0.00001% in view of economic considerations.

To measure the effect on tooth enamel of enamel solubility reducing agents in dentifrices, dental researchers frequently use as an indicator the reduction in the amount of enamel dissolved or ESR test, as disclosed in Holliday et al., U.S. Pat. No. 3,105,798, issued Oct. 1, 1963. Holliday et al. determined ESR following treatment of teeth with a dentifrice by measuring the decrease in amount of $Ca^{45}$ and $P^{32}$ dissolved from irradiated teeth by a measured volume of 0.1 N lactic acid-sodium lactate adjusted to a pH of 4.5. Another method for measuring ESR, the method used herein, is the lessened decrease in hardness of enamel, following exposure to one of the novel dentifrices herein described, when the enamel is dissolved in the artificial mouth with an acid pH buffered acetate solution or when it is dissolved in the artificial mouth by acid produced by an acid-producing streptococcus isolated from dental plaque; Pigman, W.: "In Vitro Production of Experimental Caries", J. Am. Dental Assn., 51 (1955), 685–696 (use of the artificial mouth in experimental caries research). Decrease in hardness of enamel due to solubilization or erosion of enamel was measured in following examples in Knoop units as determined with a Knoop diamond indenter using a Tukon hardness tester; W. T. Sweeney: "The Knoop Identation Hardness Instrument as a Tool in Dental Research", J. Dent. Res. 21 (1942), 303; R. W. Phillips e.a., "Effect of Fluorides on Hardness of Tooth Enamel", J. Am. Dent. Assn. 37 (1948), 1; and T. Koulourides e.a., "Rehardening of Softened Enamel Surfaces of Human Teeth by Solutions of Calcium Phosphates", Nature, 189 (1961), 226–227.

Example 12 - Artificial Mouth Test: Enamel Solubility Reduction

Portions of extracted sound human teeth were cut into pieces, each with a 3 to 6 millimeter square caries-free enamel surface. The enamel surfaces were mounted in epoxy resin, sterilized by immersion in 70 percent ethanol for 2 hours, then placed in series in the chamber of a plurality of artificial mouths (Pigman, W.: J. Am. Dental Assn. 51:685) maintained at 37° C. and rinsed three times with trypticase soy broth (TSB). The enamel was covered with fresh TSB and the liquid medium was inoculated with a pure strain of acid-producing streptococcus isolated from human dental plaque. After 12 to 18 hours, turbidity in the medium and plaque on the enamel surface were observed. TSB medium and a slurry of 1 weight percent distannous EDTA in aqueous 0.5 percent Methocel HG hydroxypropyl methylcellulose were dripped into the artificial mouth chamber onto the enamel surfaces at the rate of approximately 10 drops per minute.

After an exposure period of 8 hours, the dripping of TSB medium distannous EDTA slurry was terminated, the artificial mouth chambers were refilled and the enamel surfaces thereby covered with TSB medium. The apparatus was incubated overnight at 37° C. The next morning, each chamber was drained, effluent collected for analysis, and the drip-procedure repeated with fresh solutions.

Control enamel surfaces exposed only to TSB medium were observed in their chambers at intervals during a dripping procedure. When these were judged to be altered by the cariogenic treatment, the experiment was terminated and all enamel surfaces were collected for analysis. Other controls were exposed to normal saline and to aqueous 0.5% Methocel HG.

The artificial mouth tests were repeated in duplicate with three enamel surfaces in each of the artificial mouths. The second dripping procedure was carried out for three 6-hour periods. The ranking in decreasing order of ESR or progressive softening and eroding of the enamel surfaces in terms of Knoop Units follows in Table I.

TABLE I

| Test Compound or Control Solution | Average Knoop Units ± Standard Deviation | |
|---|---|---|
| | Before | After |
| 1% $Sn_2''EDTA$ in 0.5% Methocel HG | 380±29 | 267±28 |
| TSB | 387±33 | 160±11 |
| Normal Saline | 375±28 | 149±10 |
| 0.5% Methocel HG | 382±48 | 140±15 |

Example 13 - Artificial Mouth Test: Enamel Solubility Reduction

Epoxy resin-mounted enamel surfaces, as described in the preceding example, were incubated at room temperature in Pyrex beakers alternately in aqueous 1% $Sn_2''EDTA$ slurry or in control solutions (0.5% Methocel HG, normal saline) then in an acetate buffer having a pH of 4.5 and being 0.2 or 0.5 normal. The slurry of distannous EDTA was stirred throughout the test with a magnetic stirrer. When control enamel surfaces were judged to be altered by the acetate buffer treatment after 16 hours, the incubation was terminated and all enamel surfaces were collected for analysis. The ranking in decreasing order of ESR or progressive softening and eroding of the enamel surfaces in terms of Knoop Units is given in following Table II for each of the two buffer solutions.

TABLE II

| Test Compound or Control Solution | Average Knoop Units ± Standard Deviation | |
|---|---|---|
| | Before | After |
| A*, 1% $Sn_2''$EDTA in 0.5% Methocel HG | 383±35 | 220±17 |
| A, 0.5% Methocel HG | 335±52 | 176±21 |
| A, Normal Saline | 384±35 | 153±30 |
| B**, 1% $Sn_2''$EDTA in 0.5% Methocel HG | 400±20 | 267±16 |
| B 0.5% Methocel HG | 386±21 | 140±10 |
| B Normal Saline | 385±30 | 123±19 |

A* 0.5N Acetate Buffer
B** 0.2N Acetate Buffer

Example 14 - Mouth Test: Sn(II) Take-Up from Chewing Gum

Portions of extracted sound human third molar and bicuspid teeth were cut into slabs having caries-free enamel surfaces following a hydrogen peroxide rinse for one minute and cleaning with fine pumice and a brush wheel on a dental engine. After sterilization, the slabs were fitted into bridge-like dental appliances and clamped over teeth in a living mouth. The dental appliances held specimens in generally occlusal, buccal and lingual positions. The slabs were embedded with self-curing resin into recesses cut into the dental appliances.

Subjects wearing the dental appliances chewed 3-gram sticks of gum containing one weight percent distannous EDTA 3 times daily for 15 minutes each for 7 days. Results of the analyses of the slabs for tin(II) content following such treatments are shown in Table III.

TABLE III

| Treatment | p.p.m. $Sn''$* | $\gamma/mm.^2$ exposed enamel surface |
|---|---|---|
| control | < 5 | <0.012 |
| chelate/occlusal | 30 | 0.11 |
| control | < 5 | <0.01 |
| control | < 5 | <0.024 |
| chelate/buccal | 14 | 0.055 |
| chelate/lingual | 36 | 0.15 |

*via spectrographic analysis

Substantially similar results are obtainable when the amount of $(Sn_2'')$EDTA is reduced to 0.01% or when another of the described stannous chelates is substituted for $(Sn_2'')$EDTA.

Example 15 - Mouth Test: Sn(II) Retention by Enamel

The procedure of the preceding example was repeated, followed by a one-week period during which the dental appliances containing the slabs were worn in the mouth without using chelate-containing chewing gum. Results of the analyses of the slabs for tin(II) content following such treatment are shown in the following Table.

TABLE IV

| Treatment | p.p.m. $Sn''$ | $\gamma/mm.^2$ exposed enamel surface |
|---|---|---|
| control | <5 | — |
| chelate/occlusal | 26 | 0.110 |
| chelate/buccal | 14 | 0.085 |
| chelate/lingual | 14 | 0.055 |

Example 16

A series of groups each of forty rats of mixed sex Osborne-Mendel caries-susceptible strain was maintained on a cariogenic diet consisting of 61% sucrose, 35% powdered whole milk, 3% alfalfa meal and 1% sodium chloride for a period of 115 days. A mixture of 3.5% $(Sn_2'')$EDTA in Orabase emollient dental paste was applied to the lower molars of one group of test rats every morning and afternoon. Orabase emollient dental paste was applied in the same way to the molars of a second group of test rats (Orabase control) while a third group acted as a second control to whose molars nothing was applied.

At the end of the 115-day test period, the rats were sacrificed and their molars examined for caries. In the caries grading system, a maximum score of 48 represents complete destruction of the crown of all molars. The two control groups had scores of 29±11 and 28±13 or approximately 60% of the maximal score, for the second control and the Orabase control groups, respectively. The group to whose molars was applied 3.5% $(Sn_2'')$EDTA in Orabase embollient dental paste had a score of 17±10, i.e., approximately 35% of the maximal score, a caries reduction of approximately 40% as compared with the controls. These results indicate a high degree of ESR.

What is claimed is:

1. A dentifrice containing from about 0.00001 to 15 percent by weight of the distannous chelate of ethylenediamenetetraacetic acid.

2. A chewing gum containing from about 0.00001 to 15 percent by weight of the distannous chelate of ethylenediamine tetraacetic acid.

3. Method which comprises contacting the enamel of teeth on a continuing basis with the distannous chelate of ethylenediaminetetraacetic acid.

4. Method which comprises chewing a chewing gum containing from about 0.00001 to 15 percent by weight of the distannous chelate of ethylenediaminetetraacetic acid.

* * * * *